United States Patent Office 3,002,960
Patented Oct. 3, 1961

3,002,960
POLYACRYLAMIDE PREPARATION
Edwin R. Kolodny, Stamford, Conn., assignor to American Cyanamid Company, New York, N.Y., a corporation of Maine
No Drawing. Filed Aug. 18, 1958, Ser. No. 755,434
6 Claims. (Cl. 260—89.7)

This invention relates to the secondary recovery of oil from oil-bearing subterranean formations by water flooding, and more particularly to improved means for increasing and controlling the viscosity of the flood water. The invention includes secondary oil recovery processes wherein aqueous flooding liquids containing the novel viscosity regulating agents are used and also the new agents themselves and their methods of preparation.

The practice of recovering crude petroleum, which is hereinafter designated simply as oil, by flooding oil-bearing sands and other porous formations with aqueous flooding liquids is well known and is described, for example, in "Secondary Recovery of Oil in the United States," second edition, published in 1950 by the American Petroleum Institute. A flooding liquid is injected into the formation, usually through a pattern of injection wells surrounding one or more producing or output wells and is forced through the formation toward the output well as a front, displacing residual oil in the formation and propelling it toward the producing well.

It has been shown that the efficiency of such flooding procedures is dependent, at least in part, on the viscosity of the crude oil in the formation being developed. Thus, on page 228 of the above publication, it is shown that the ratio of recoverable oil to water can be expressed by the formula $$\frac{W}{O} = \frac{K_w}{K_o} \times \frac{V_o}{V_w}$$

where $$\frac{W}{O}$$

is the water-oil ratio, $K_o$ and $K_w$ are the relative permeability of sand to oil and to water, respectively, $V_w$ is the viscosity of the water in centipoises and $V_o$ is the viscosity of the oil in centipoises. It is apparent from this formula, and is explained in the cited article, that the flooding efficiency increases as the viscosity of the oil approaches that of water. It is also apparent that the flooding efficiency can be improved correspondingly by increasing the viscosity of the flooding liquid in order that it may more nearly approach that of the oil, and many viscosity-increasing solutes for the flood water have been suggested for this purpose.

The flooding of an oil field in which production by normal methods has diminished or stopped is an extensive undertaking. A suitable pattern of input and production wells must be established, the most common being the location of four injection wells around each production well, and a pilot flood may be started to determine if the formation is suitable for flooding operations. The quantity of flooding solution that must be forced into the formation through the input wells is very large, and the viscosity-increasing solute must therefore function at a relatively low concentration as otherwise its cost would be prohibitive. In one operation of this type, for example, cost figures have indicated that the economical limit is a treating cost of 0.5 cent per gallon or 21 cents per barrel of flood water. A suitable viscosity-increasing agent must also be able to withstand elevated subterranean temperatures, which may average in the neighborhood of 150° F., for long periods of time. It must also be non-precipitating in the presence of inorganic salts dissolved from the formation and must maintain its viscosity-increasing properties in the presence of substantial concentrations of dissolved inorganic salts, since brackish water containing on the order of 1500 parts per million or more of such salts must frequently be used as the flooding liquid. There must be little or no adsorption of the solute into the formation as this would represent a severe loss and might also tend to block off narrow subterranean passages through which the flood must pass.

It is a principal object of the present invention to provide a class of viscosity-increasing agents for the above-described flooding processes, which agents are so highly efficient that they will impart relatively high viscosities to flooding water at formation temperatures when used in concentrations within the range of about 0.05% to 0.5-1% by weight, and which are relatively insensitive to inorganic salts dissolved in the flooding water. It is a further object of the invention to provide a novel class of compounds having unusually great viscosity-imparting properties for the flood water, and methods for the preparation of these new compounds. Other objects of the invention will become apparent from the following description of specific embodiments thereof, when taken with the appended claims.

The viscosity-increasing agents provided by the present invention are polyacrylamides, many of which have empirical formulas similar to those of the presently known linear polymers of acrylamide but which have considerably greater viscosity-imparting properties for oil field flood waters. I have found that it is possible to prepare polyacrylamides of unusually high molecular weight, which possesses viscosity-imparting powers for flood water far greater than could be expected from a consideration of the presently known compounds of this class. For example, one polyacrylamide product that is now available commercially and which has been suggested for use in flooding operations (see U.S. Patent No. 2,827,964) exhibits a viscosity of 3.5 cps. at 0.25% concentration and of 7.2 cps. at 0.5% concentration in water at 60° C. when measured with a Brookfield viscosimeter at 6 r.p.m. This polymer is advertised as having a molecular weight of about three million. By comparison a polyacrylamide representative of the novel compounds of my invention has a molecular weight in excess of 12 million and exhibits viscosities of about 20 and about 310 centipoises at 60° C. in concentrations of 0.25% and 0.5%, respectvely, when measured in the same instrument. The viscosity of a 1% solution in water is about 4000 centipoises at 30° C. It will be evident, therefore, that much higher viscosities are attainable in flood waters with equivalent concentrations of my new products, or that lower viscosities may be attained if desired at a considerably less treating cost.

The polyacrylamides employed in practicing the flooding processes of the present invention will be defined hereinafter by their intrinsic viscosities, which are regularly employed by polymer chemists as a measurement of molecular weight. As used in the present specification and claims the term "intrinsic viscosity" is a value, expressed in deciliters per gram of polymer, which is proportional to the effective hydrodynamic volume or size of the polymer in solution at zero concentration; i.e., at infinite dilution. See J. Polymer Science, vol. 5, pages 745–7 (1950). This value must be distinguished from ordinary viscosity as measured in centipoises, since the latter term expresses the relationship of the resistance to flow of the liquid being measured to that of water at 68.6° F.

The intrinsic viscosity of a polyacrylamide is determined from the rate of flow of its dilute solutions in solvents such as 0.1 normal aqueous sodium chloride or normal aqueous sodium nitrate at 30° C. and at several concentrations. The ratio of the viscosity of the solution of the polymer at any one concentration to the viscosity of the solvent, as measured at 30° C., is the relative viscosity ($N_r$) at this concentration. This value minus one is equal to the specific viscosity ($N_{sp}$). The intrinsic viscosity is determined by plotting the ratio of the specific viscosity ($N_{sp}$) to the concentration of polymer against the concentration of the polymer and extrapolating the resultant plot to zero concentration. Ordinarily viscosities are of course measured directly in standard instruments such as the Brookfield viscosimeter in which a spindle is rotated at a definite speed in the polymer solution and the resistance to motion is measured in centipoises.

Molecular weight studies based on light scattering and other indicia have shown that the weight average molecular weight of a polyacrylamide is expressed accurately by the formula Intrinsic viscosity in deciliters per gram = $3.73 \ M^{0.66} \times 10^{-4}$ wherein M is the weight average moleuclar weight.

Investigations of the viscosity-imparting properties of high molecular weight polyacrylamides have shown that those capable of increasing the viscosity of flood water to the range of at least about 8-10 centipoises at 60° C. when used at 0.25% concentration must have an intrinsic viscosity of at least 12 deciliters per gram when measured at 30° C., which corresponds to a weight average molecular weight of about 6.5 million. The flooding process of my invention, in its broadest aspects, therefore consists essentially in the steps of dissolving a polyacrylamide having an intrinsic viscosity of at least 12 deciliters per gram in the flood water and forcing the resulting solution through a subterranean oil-bearing formation. I have found, however, that much more efficient and economical operations are possible by employing, as a viscosity-increasing agent, a new class of polyacrylamides which I have discovered and which will be described herein in greater detail; these new polyacrylamides are characterized by an intrinsic viscosity of at least 18 deciliters per gram and therefore have molecular weights of about 12 million and higher. The viscosities attainable by dissolving relatively low concentrations of these new polyacrylamides in flooding water are remarkable and are usually within the range of from 15 to 25 centipoises at 0.25% concentration when measured in a Brookfield viscosimeter at 60° C.

In practicing the process of the invention a suitable oil-bearing formation is flooded by forcing therethrough in the direction of an output well located therein a flood of water in which one or more of the above-described high molecular weight polyacrylamides is dissolved. The concentration of polyacrylamide in the flood water will depend on a number of factors including particularly the viscosity of the oil and the porosity of the formation, as indicated by the above-quoted formula, and will be determined in each case by the engineers conducting the flooding operation. Concentrations as low as 0.05% will produce a material increase in the viscosity of the flood water at formation temperatures, while amounts of 0.5% by weight or even higher may be used in flooding formations containing crude oil of relatively high viscosity. Suitable concentrations to be employed are therefore described in the appended claims as viscosity increasing amounts.

It will be understood that the viscosity increasing agents of the invention may be used advantageously in a variety of flooding procedures. Thus, for example, it has been proposed to conduct flooding operations through formations of suitable porosity by injecting a first flood or front of a high viscosity solution followed by a drive of plain water or of solution having a lower viscosity; the polyacrylamide of the invention are well suited for use in the front of such operations. Continuous flooding procedures in which aqueous solutions of the high molecular weight polyacrylamides are pumped down a number of injection wells penetrating the oil-producing formation in quantities and for times such that the required percentage of the formation pore space is filled may also of course be used. The flood water may contain other preferred or fortuitous solutes such as surface-active agents to promote preferential wetting of the formation, polyphosphates such as tetrasodium pyrophosphate or sodium hexametaphosphate to sequester calcium ions and dissolved inorganic salts such as sodium chloride and the like. Dilute aqueous brine solutions are sometimes purposely used in flooding clay-containing formations in order to offset the swelling of the clay by ordinary water, and it is an important advantage of the high molecular weight polyacrylamides of the invention that they are not sensitive to such dissolved salts.

The polyacrylamides used in practicing the flooding process of the invention and having intrinsic viscosities of at least 12 and preferably 18 or greater are prepared by polymerizing aqueous monomeric acrylamide solutions in the presence of particular classes of redox catalyst systems. These are mixtures of water-soluble tertiary amines with oxidizing agents such as the water-soluble persulfates, for example an alkali metal or ammonium persulfate, or with peroxides such as hydrogen peroxide and the like and, as a second class, mixtures of water-soluble bromates such as an alkali metal bromate with water-soluble sulfite reducing agents such as sodium sulfite or sodium bisulfite. When these catalyst systems are used it is possible to obtain polyacrylamides of any desired molecular weight within the ranges discussed above by controlling the polymerization temperature and the molar ratios of the two ingredients of the redox catalyst system.

When the tertiary amine-chemical oxidant redox system is used, polyacrylamides having intrinsic viscosities of 18 and higher are obtained by employing a substantial molar excess of tertiary amine over the persulfate or peroxide, and in most cases quantities of from 2 to about 6 mols of tertiary amine for each mol of persulfate or peroxide should be used. Polyacrylamides have intrinsic viscosities within the range of from 12 to 18 are also obtainable with molar ratios of the catalyst ingredients within this range when polymerization temperatures in excess of about 30° C. are used, particularly when the weight ratio of the catalyst system to the acrylamide monomer in solution is increased. When the second type of redox system is used the preferred new polyacrylamides having intrinsic viscosities of at least 18 are produced by operating at temperatures below 20° C. and preferably below 10° C. with a system containing from about 0.1 to 0.8 mol of the sulfite for each mol of the bromate. The intrinsic viscosity of the polymer decreases as the molar ratio of the sulfite to the bromate approaches 1:1, and also as the weight ratio of bromate to acrylamide monomer is increased. By controlling these ratios it is possible to produce a polyacrylamide having an intrinsic viscosity of 12 or greater. Further details including the results obtained with particular catalyst ratios and polymerization temperatures are described in the following specific examples.

It has been known for many years that polyacrylamides containing carboxylic acid groups, such as polyacrylamides partially hydrolyzed with sodium hydroxide, will form much more viscous solutions when dissolved in pure water than solutions of the corresponding unhydrolyzed polyacrylamides from which they are prepared. This is due to their transformation into polyelectrolytes wherein all the carboxylate groups, formed by the hydrolysis, carry like ionic charges. However most of this viscosity increase is lost in water containing dissolved inorganic salts, which change the dielectric of the medium so that the mutual repulsion of the charged groups is nullified. The high molecular weight polyacrylamides of the present invention undergo a corresponding increase in their viscosity-imparting power when they are partially hydrolyzed, and they may therefore be used in this condition in the flooding operations described above. In most cases, however, the advantages obtained by partial hydrolysis is more apparent than real, since contamination of the flood water by dissolved salts will quickly reduce its viscosity to a value not greatly different from that which would have been obtained if the unhydrolyzed polyacrylamide had been used. On the other hand some hydrolysis of the polyacrylamides may occur spontaneously during the flooding process under the influence of elevated water temperatures in the formation, and it should be noted that in this event they are still effective to accomplish the objects of the invention even in the presence of relatively high concentrations of dissolved salts.

It will thus be seen that the invention provides a solution to the problem of obtaining almost any desired viscosity increase in flooding waters without resorting to correspondingly increased concentrations of solute by increasing the degree of polymerization of water-soluble polyacrylamides and acrylamide-acrylic acid copolymers to a range wherein they exhibit unexpectedly high viscosity-imparting properties. This solution of the problem is economically feasible because the manufacturing cost of the unusually high molecular weight polymers used in practicing the present invention is not materially greater than that of the polyacrylamides now on the market. It is an especially important advantage of the invention that viscosity-increasing solutes are provided having a wide range of viscosity-imparting properties, so that particular grades of polymer can be employed in accordance with the viscosity characteristics of the petroleum in the formation being flooded. For most purposes the new polyacrylamides having intrinsic viscosities of 18 or greater will be used, since these can be employed at lower concentrations with a corresponding saving in the cost of the operation, but in special situations it may be preferable to utilize polyacrylamides having intrinsic viscosities within the range of 12-18.

The following examples describe methods for the preparation of representative polyacrylamides of the invention and illustrate the viscosities obtainable by incorporating them into flood waters. It will be understood, however, that these examples are given primarily for illustrative purposes and that the invention in its broader aspects is not limited thereto.

EXAMPLE 1

Pure water (distilled or deionized) is freed from oxygen by boiling for 10 minutes or longer and cooling under an atmosphere of nitrogen and used to prepare an acrylamide solution containing 100 parts by weight of acrylamide for each 900 parts of water. This solution is charged into a reactor containing a submerged inlet for the injection of nitrogen and surrounded by a cooling bath effective to maintain the reaction temperature at 20°±1° C. Ammonium persulfate and 3,3′,3″-nitrilotrispropionamide are added in amounts of 0.04% and 0.16%, respectively, on the weight of the acrylamide and mixed by a vigorous injection of nitrogen whereupon active polymerization begins within a few minutes. The polymerization is continued under a nitrogen blanket for about 8 hours when it is usually about 98% complete. The final product is a tough rubbery gel which may conveniently be put into solution by mixing with water in a sigma blade mixer or converted to a powder by direct methanol precipitation.

The molecular weights of the polyacrylamides described in the present examples were determined by first measuring the viscosities at 30° C. in a capillary viscometer of the Ubbelohde or suspended level type, which is made by the Cannon Instrument Company at State College, Pa. Viscosities of the novel high molecular weight polyacrylamides were measured in the No. 50 instrument in which the rate of shear varies between 600 and 1500 reciprocal seconds at the solids concentrations used. Measurements were made at 30° C. in 0.1 N aqueous sodium chloride solutions at several different polymer solids concentrations within the range of about 0.1% to 0.01% and were plotted and extrapolated to infinite dilution, which gives the intrinsic viscosity of the polymer. Molecular weights were calculated by substituting this value in the formula described above.

The intrinsic viscosities of the novel polyacrylamides prepared by the above-described procedure are within the range of about 18 to 30 and therefore their molecular weights range from about 12 to about 26 million and higher.

Polyacrylamides within this molecular weight range and having comparable viscosity-imparting properties in dilute aqueous solutions are also obtained when corresponding quantities of other water-soluble tertiary amines are substituted, in whole or in part, for the nitrilotrispropionamide described above. Typical amines of this class that may be used are dimethylaminopropionitrile, dimethylaminoacetonitrile, beta - methylisopropylaminopropionitrile, beta - methyl - n - butylaminopropionitrile, methyl-beta-cyanoethylaminoacetonitrile, dimethylaminopropanediol and tertiary alkylolamines such as triethanolamine. These and other tertiary amines are preferably used in quantities of about 2 to 6 mols for each mol of persulfate. When all other conditions are the same the molecular weight of the polyacrylamide increases with an increasing molar ratio of amine to persulfate to a maximum at about 4:1, and therefore this is the preferred ratio. The molecular weight also increases with decreasing amounts of catalyst and therefore the concentration of persulfate should be as low as is consistent with good conversion yields when polyacrylamides having intrinsic viscosities of 18 and higher are desired. The recommended minimum is about 0.04% of the weight of the acrylamide monomer used and a suitable range of catalytic amounts is from this value up to about 0.1%. The reaction mixture should be free from acids, which impair the activating power of the amine in the redox catalyst system, and therefore carbon dioxide-containing gases should not be used as the oxygen-excluding atmosphere.

Polyacrylamides having a sufficiently high molecular weight to obtain the advantages of the invention are obtained with this catalyst system when polymerization temperatures within the range of from about 10° C. to about 35° C. are used. Within this range a low polymerization temperature is the most significant factor favoring high molecular weight. The influence of the factors discussed on the viscosity-imparting properties of the polymers is shown by the representative preparations in the following table. In all cases the amine was nitrilotrispropionamide (NP) and 0.04% of ammonium persulfate (AP) was used.

Table 1

| Polymer No. | Monomer Conc., percent | Temp., ° C. | Mol Ratio, AP:NP | Brookfield Viscosity (cps.)[1] (0.25% Soln. at 60° C.) |
| --- | --- | --- | --- | --- |
| 1 | 10 | 20 | 1:3 | 19.3 |
| 2 | 10 | 20 | 1:4 | 23.2 |
| 3 | 10 | 20 | 1:5 | 21.2 |
| 4 | 10 | 20 | 1:6 | 16.35 |
| 5 | 10 | 30 | 1:3 | 12.5 |
| 6 | 5 | 30 | 1:4 | 12.6 |

*At 6 r.p.m., U.L. adapter.

Viscosities within the range of 10-15 centipoises at

60° C. are obtainable with 0.25% solutions of the polymers prepared at 30° C. Those prepared at lower temperatures can be used at considerably lower concentrations. It will be understood that the optimum viscosity range may vary widely with the oil-bearing formation to be flooded and the type and distribution of oil therein and other field conditions and therefore it is not feasible to prescribe rigid limits of viscosity, but Table I indicates that the polyacrylamides of the present invention will produce flooding water of any specified viscosity range at higher dilutions that those which would be necessary with other materials of lower molecular weight. Concentrations within the range of about 0.05% to 0.5% are suitable for most flooding operations.

EXAMPLE 2

The results obtainable with other tertiary amine catalysts are illustrated in Table II wherein TEA means triethanolamine, DAN means dimethylaminoacetonitrile, and DPD means dimethylaminopropanediol. The monomer concentration was 10% and 0.04% of ammonium persulfate (AP) was used. Viscosities were measured with a Brookfield viscosimeter at 6 r.p.m. in water solution at 60° C. and all except polymer No. 11 were at 0.25% concentration.

*Table II*

| Polymer No. | Temp., °C. | Amine Used | Mol Ratio, Amine:AP | Conv., percent | Viscosity |
|---|---|---|---|---|---|
| 7 | 20 | TEA | 1:4 | 99.1 | 22.8 |
| 8 | 20–25 | DAN | 1:1 | 99.1 | 22.6 |
| 9 | 20 | DPD | 1:2 | 97.7 | 17.4 |
| 10 | 20 | DPD | 1:4 | 98.7 | 25.5 |
| 11 | 15 | TEA | 1:4 | 99.1 | Table III |

Dilute water solutions of the novel polyacrylamides of the invention are not affected by dissolved inorganic salts, and therefore they can be used in salt-contaminated flood water. This is shown by the viscosity measurements of 0.5% water solution of polymer No. 11.

*Table III*

| NaCl, p.p.m. | Brookfield viscosity at 30° C. (cps.) |
|---|---|
| None | 183 |
| 500 | 181 |
| 1000 | 181 |
| 1500 | 182 |

EXAMPLE 3

A bromate-sulfite catalyst has several advantages over the amine-persulfate system of the preceding examples. It is not acid-sensitive and therefore a carbon dioxide-containing gas can be used as an oxygen-excluding blanket. Moreover, it is possible to prepare high molecular weight copolymers of acrylamide with up to about 15 mol percent of acrylic acid using this catalyst system; these copolymers are useful for increasing the viscosity of flood water and also for a number of other purposes. Copolymers of acrylamide with up to about 15 mol percent of other olefin carboxylic acids copolymerizable therewith such as methacrylic acid, itaconic acid and the like can also be prepared with this catalyst system.

Polyacrylamides having intrinsic viscosities of at least 12 deciliters per gram are produced with this catalyst system at temperatures below about 20° C.; the preferred polymers having intrinsic viscosities of about 18 to 26 are obtainable at 10° C. and lower. When all other conditions are the same the molecular weight of the polyacrylamide increases with an increasing molar ratio of bromate to sulfite and also with increasing weight ratio of bromate to acrylic monomer within the range of catalytic amounts, which are from about 0.02% to about 0.1%. The novel polyacrylamides of the invention having intrinsic viscosities within the range of about 18—26 are obtained with bromate-sulfite mixtures containing from about 0.1 to about 0.5 mol of the sulfite for each mol of the bromate while the polyacrylamides with intrinsic viscosities in the range of 12—17 are produced with higher proportions of sulfite up to about 0.8 mol per mol of bromate or with higher bromate-acrylamide ratios or both. When the molar proportion of sulfite to bromate is 1:1 or slightly less there is a sharp drop in the viscosity-imparting properties of the polyacrylamide.

The influence of these factors is shown by the preparations listed in Table IV. In all cases the procedure of Example 1 was repeated using an aqueous 10% acrylamide solution and a sodium bromate-sodium sulfite catalyst. In the headings of the table B means sodium bromate, S means sodium sulfite, Conv. means conversion to polyacrylamide, the Brookfield viscosities were measured at 60° C. in 0.25% water solution at 6 r.p.m. and are expressed in centipoises, and the percentage of sodium bromate is based on the weight of the acrylamide.

*Table IV*

| Polymer No. | Temp., °C. | Mol Ratio, B:S | Percent B | Percent Conv. | Brookfield Viscosity |
|---|---|---|---|---|---|
| 12 | 0–7 | 1:1 | 0.03 | ---- | 5.2 |
| 13 | 0–6 | 1:0.8 | 0.03 | 99.2 | 8.2 |
| 14 | 0 | 1:0.3 | 0.03 | 99 | 17.6 |
| 15 | 1–10 | 1:0.2 | 0.03 | 99 | 19.1 |
| 16 | 0–8 | 1:0.5 | 0.02 | 99 | 12.9 |
| 17 | 0–5 | 1:0.3 | 0.02 | 97.6 | 27.8 |
| Polymer No. 17+1,500 p.p.m. of NaCl | | | | | 27.6 |

The intrinsic viscosities of polymers Nos. 13 and 17 were measured in the Ubbelohde instrument described in Example 1 and were found to be 12 and 18 respectively. They were measured again in another instrument having a different rate of shear and from the two sets of values the intrinsic viscosities at zero shear were calculated as 14.4 for polymer No. 13 and 22 for polymer No. 17. The viscosities of polymer No. 17 at varying concentrations in water at 60° C. were as follows:

| Con., percent: | Viscosity, cps. |
|---|---|
| 0.10 | 4.5 |
| 0.15 | 9.0 |
| 0.175 | 12.0 |
| 0.20 | 15.0 |
| 0.25 | 27.6 |

EXAMPLE 4

A polyacrylamide, designated as polymer A in Table V, having an intrinsic viscosity of 18 was prepared by the procedure described in Example 1. The viscosity of an 0.1% solution of this polymer in pure water, as measured in the Brookfield viscosimeter at 60° C. and 6 r.p.m., was 3.4 centipoises. A portion was heated with aqueous sodium hydroxide until it was 5% hydrolyzed and the viscosities of 0.1% solutions in pure water and in salt water containing 1500 p.p.m. of NaCl were measured in the same viscosimeter at 60° C. The viscosity of an 0.1% solution of the slightly (about 1%) hydrolyzed polyacrylamide described in U.S. Patent No. 2,827,964, which has a weight average molecular weight of about three million and is designated as polymer B was also measured in pure water for purposes of comparison. The results were as follows:

*Table V*

| Conc., Percent | Polymer A in Water Brookfield Vis. (cps.) at 60° C. and 6 r.p.m. | Conc., Percent | Polymer B in Water Brookfield Vis. (cps.) at 60 °C. and 6 r.p.m. |
|---|---|---|---|
| 0.075 | 2.7 | | |
| 0.10 | 3.4 | 0.10 | 1.6 |
| 0.15 | 6.3 | | |
| 0.25 | 19.7 | 0.25 | 3.5 |
| 0.30 | 31.2 | | |
| 0.50 | 310 | 0.50 | 7.2 |
| | Polymer A, 5% Hydrolyzed | | Polymer B in Salt Water |
| 0.1% soln. in water | 47.8 | 0.25 | 3.4 |
| 0.1% soln. in salt water | 4.4 | 0.50 | 6.0 |

Partial hydrolysis increases the viscosity of an 0.1% solution of a polyacrylamide of the present invention by a factor of 14 but most of this increase is lost in salt water. It is seen, however that the viscosity of the polymer before hydrolysis and also after hydrolysis and in salt water is much higher than that of a conventional partially hydrolyzed polyacrylamide in pure water and in salt water.

What I claim is:

1. A method of producing a polyacrylamide having an intrinsic viscosity of at least 12 deciliters per gram which comprises polymerizing acrylamide in aqueous solution free from carbon dioxide at a temperature within the range of from about 10° to 35° C. in the presence of a catalyst mixture of a water-soluble tertiary amine selected from the group consisting of 3,3',3"-nitrilotrispropionamide, dimethylaminopropionitrile, dimethylaminoacetonitrile, β-methylisopropylaminopropionitrile, β-methyl-n-butylaminopropionitrile, methyl-β-cyanoethylaminoacetonitrile, dimethylaminopropanediol and triethanolamine and a water-soluble inorganic persulfate oxidizing agent containing from about 2 to 6 mols of the amine for each mol of the oxidizing agent.

2. A method according to claim 1 in which the oxidizing agent is ammonium persulfate.

3. A method according to claim 1 in which the molar ratio of tertiary amine to oxidizing agent is about 4:1.

4. A method of producing a polyacrylamide having an intrinsic viscosity of at least 12 deciliters per gram which comprises polymerizing a member of the group consisting of acrylamide and mixtures of acrylamide with not more than about 15 mol percent of a water-soluble olefin carboxylic acid copolymerizable therewith in aqueous solution at a temperature below about 20° C. in the presence of a catalyst mixture of a water-soluble alkali metal bromate and a water-soluble alkali metal sulfite containing from about 0.1 to 0.8 mol of the sulfite for each mol of the bromate.

5. A method of producing a polyacrylamide having an intrinsic viscosity of at least 12 deciliters per gram which comprises polymerizing acrylamide in aqueous solution at a temperature below about 20° C. in the presence of a catalyst mixture of a water-soluble alkali metal bromate and a water-soluble alkali metal sulfite containing from about 0.1 to 0.8 mol of the sulfite for each mol of the bromate.

6. A method of producing a polyacrylamide having an intrinsic viscosity of at least 18 deciliters per gram which comprises polymerizing acrylamide in aqueous solution at a temperature below about 10° C. in the presence of a catalyst mixture of a water-soluble alkali metal bromate and a water-soluble alkali metal sulfite containing from about 0.1 to 0.5 mol of the sulfite for each mol of the bromate.

References Cited in the file of this patent

UNITED STATES PATENTS

| 2,486,191 | Minsk et al. | Oct. 25, 1949 |
| 2,733,206 | Prusick et al. | Jan. 31, 1956 |
| 2,820,777 | Suen et al. | Jan. 21, 1958 |
| 2,842,492 | Engelhardt et al. | July 8, 1958 |
| 2,875,047 | Oster | Feb. 24, 1959 |
| 2,917,477 | Suen | Dec. 15, 1959 |

OTHER REFERENCES

Oster: "Nature," February 13, 1954, vol. 173, pp. 300–301.